(12) United States Patent
Chapman et al.

(10) Patent No.: US 7,114,003 B2
(45) Date of Patent: Sep. 26, 2006

(54) CONTENT NETWORKS

(75) Inventors: Alan S. Chapman, Kanata (CA); Elwyn B. Davies, Ely (GB); Hsiang T. Kung, Lexington, MA (US)

(73) Assignee: Nortel Networks Limited, Montreal (CA)

( * ) Notice: Subject to any disclaimer, the term of this patent is extended or adjusted under 35 U.S.C. 154(b) by 808 days.

(21) Appl. No.: 09/751,289

(22) Filed: Dec. 29, 2000

(65) Prior Publication Data

US 2002/0087659 A1 Jul. 4, 2002

Related U.S. Application Data (60) Provisional application No. 60/240,999, filed on Oct. 18, 2000.

(51) Int. Cl.
*G06F 15/16* (2006.01)
(52) U.S. Cl. ............ 709/238; 709/239; 709/709; 709/242
(58) Field of Classification Search ........ 709/238–239, 709/242, 217, 226, 245; 370/238, 389
See application file for complete search history.

(56) References Cited

U.S. PATENT DOCUMENTS

| 6,381,237 | B1* | 4/2002 | Lam et al. ................ 370/351 |
| 6,389,475 | B1* | 5/2002 | Speakman et al. .......... 709/232 |
| 6,421,731 | B1* | 7/2002 | Ciotti et al. ................ 709/238 |
| 6,542,468 | B1* | 4/2003 | Hatakeyama .............. 370/238 |
| 6,564,258 | B1* | 5/2003 | Uniacke ..................... 709/223 |
| 6,567,380 | B1* | 5/2003 | Chen ......................... 370/238 |
| 6,745,237 | B1* | 6/2004 | Garrity et al. .............. 709/219 |
| 6,748,420 | B1* | 6/2004 | Quatrano et al. .......... 709/205 |
| 6,771,662 | B1* | 8/2004 | Miki et al. ................. 370/469 |
| 6,850,980 | B1* | 2/2005 | Gourlay .................... 709/226 |
| 2002/0049037 | A1* | 4/2002 | Christensen et al. ....... 455/3.06 |

* cited by examiner

*Primary Examiner*—Abdullahi Salad
(74) *Attorney, Agent, or Firm*—Hunton & Williams, LLP (57) ABSTRACT

According to the present invention, a technique for delivering content over a network having endpoints and nodes that store content is provided. In one embodiment, the technique is realized by first launching a request for content from a requesting end point. Then propagating the request over the network to the nodes. While the request propagates, it leaves a trail at the nodes and, when content matching the request is located, a copy of the content is returned to the requesting endpoint over the trail left by the request.

8 Claims, 6 Drawing Sheets

CONTENT NETWORKS

CROSS-REFERENCE TO RELATED APPLICATIONS

This patent application claims priority to U.S. Provisional Patent Application No. 60/240,999, filed Oct. 18, 2000, which is hereby incorporated by reference herein in its entirety.

FIELD OF THE INVENTION

The present invention relates generally to delivery of content over networks and, more particularly, to a technique for how a network can operate to deliver content based on the content itself. The operation is independent of the transport mechanism and indeed does not require the traditional Internet Protocol (IP) network layer, although the protocols can work on top of an IP network layer.

BACKGROUND OF THE INVENTION

The primary purpose of the Internet today, and for the foreseeable future, is carrying content from sources to consumers. The volume of traffic is often more than a single content source host can handle and mechanisms have been developed that spread load by making multiple servers look like one end point or by replicating data at multiple sites and redirecting sessions. Because an IP network is architecturally designed for point-to-point connections between specific addresses, these mechanisms are unwieldy and require changing the operation of basic mechanisms such as the domain name service (DNS) that returns an IP address for a given name.

When the same content is required by many consumers, the IP network does not spontaneously create a multi-cast situation. Multi-cast is emulated by caching information at many points and the choice of what gets cached is based on a guess at future requests or observations of previous transactions.

AN IP network is optimized for delivery of packets from one end point address to another. A future network should be designed to carry content from sources to consumers and to naturally facilitate replication and multi-cast. End-to-end connections should be a small subset of overall network function.

With the advent of very high speed networks, the granularity of information transfer can be much less (bigger chunks) than the IP packet. The larger payload permits much larger "headers". The use of a large header permits the breaking away from the address oriented model where the header is used to route the data to a known end-point.

In view of the foregoing, it would be desirable to provide a technique for delivering content which overcomes the above-described inadequacies and shortcomings. More particularly, it would be desirable to provide a technique for delivering content over a network in an efficient and cost effective manner.

SUMMARY OF THE INVENTION

According to the present invention, a technique for delivering content over a network having endpoints and nodes that store and forward content is provided. In one embodiment, the technique is realized by first launching a request for content from a requesting end point. Then propagating the request over the nodes of the network. While the request propagates, it leaves a trail at the nodes and, when content matching the request is located, a copy of the content is returned to the requesting endpoint over the trail left by the request.

In accordance with other aspects of the present invention, the content may further comprise a descriptor that enables the nodes to identify an attribute of the content. In these embodiments, launching a request may further comprise launching the request with a request payload containing one or more instructions on what to locate in the descriptor.

In accordance with further aspects of the present invention, the request for content may include a persistence indicator that indicates a duration for which the request is to be preserved at the nodes.

In accordance with still further aspects of the present invention, the technique may include comparing the request payload to the descriptor of the content stored at the nodes and, when the request payload matches the descriptor, forwarding the content with the matching descriptor to the adjacent node from which the request was received.

In accordance with still further aspects of the invention, the technique may include the registration of the presence of content. The registration may be propagated separately from the content to facilitate directing the requests toward the location at which the content is stored.

In accordance with still further aspects of the invention, the technique may include a method for transferring content over a network comprising one or more nodes wherein the one or more nodes are enabled to route messages related to the transfer of content. Transferring content may include the following steps: transmitting a content registration message when new content is available at the one or more nodes, wherein the content registration message advertises to the one or more nodes that the new content is available; transmitting a request registration message when requesting content from the one or more nodes, wherein the request registration message advertises to the one or more nodes an interest in locating a particular content; transmitting a content delivery message when the particular content requested is located at the one or more nodes; and transferring the particular content requested or a copy of the particular content requested toward the one or more nodes from which the request registration message was transmitted.

In accordance with still further aspects of the invention the technique may include propagating the content registration message to the one or more nodes, and building a routing table entry at the one or more nodes using the content registration message and the request registration message.

The present invention will now be described in more detail with reference to exemplary embodiments thereof as shown in the appended drawings. While the present invention is described below with reference to preferred embodiments, it should be understood that the present invention is not limited thereto. Those of ordinary skill in the art having access to the teachings herein will recognize additional implementations, modifications, and embodiments, as well as other fields of use, which are within the scope of the present invention as disclosed and claimed herein, and with respect to which the present invention could be of significant utility.

BRIEF DESCRIPTION OF THE DRAWINGS

In order to facilitate a fuller understanding of the present invention, reference is now made to the appended drawings.

These drawings should not be construed as limiting the present invention, but are intended to be exemplary only.

DETAILED DESCRIPTION OF EXEMPLARY EMBODIMENT(S)

Figure 1:
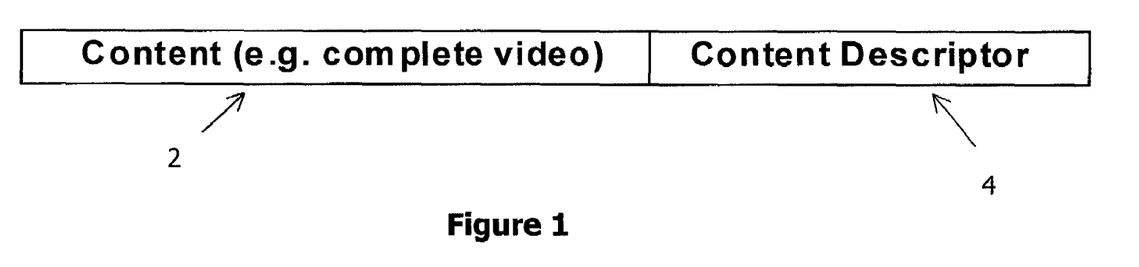
FIG. 1 is a schematic representation of data content and a content descriptor according to one embodiment of the present invention.

As shown in FIG. 1, every segment of content 2 is attached to a descriptor 4 for the content 2. Routing through the network is effected based on that descriptor 4 and directs the content 2 to those who request it. A representation of one embodiment of a network node is shown in FIG. 2.

Figure 2:
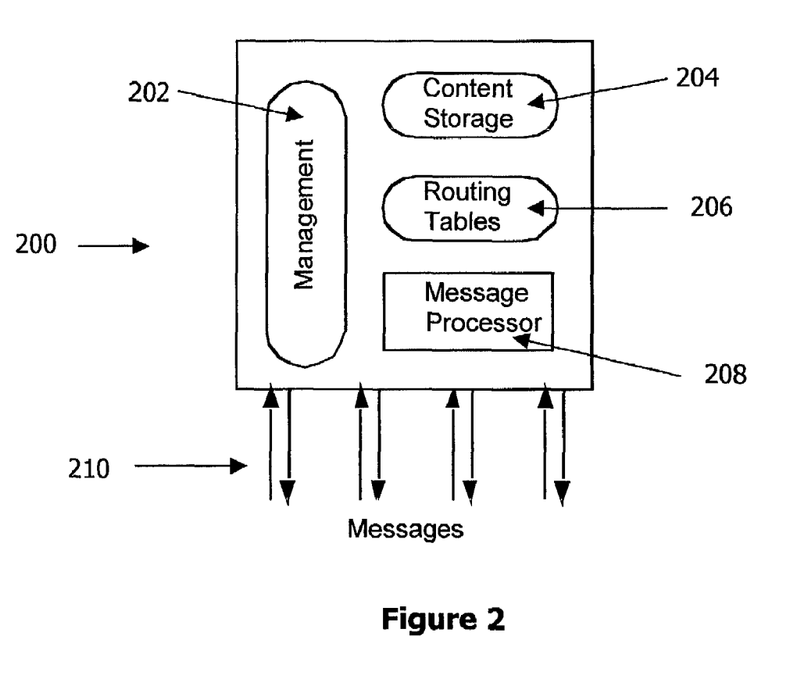
FIG. 2 is a schematic representation of a content switching node according to one embodiment of the present invention.

As shown in FIG. 2, node 200 may comprise any suitable network node. For example, node 200 may comprise a processor based device that stores, manages, routes, and otherwise handles network message traffic.

In some embodiments, node 200 may comprise a management module 202 that contains instructions for management of network traffic, accounting policies, and the like.

Node 200 may also comprise content storage 204 that stores content, including content descriptors, at the node 200. Content may be temporarily stored (e.g., while in transit) or stored for an indefinite period until later requested.

Node 200 may also comprise routing tables 206 that rout network messages. For example, routing tables 206 may store content registrations and request registrations. In addition, routing tables 206 may map the messages to the neighboring node from which the message arrived.

Node 200 may also comprise message processor 208 that processes network messages including request registration messages, content registration messages, and content delivery messages. Receipt and forwarding of messages is indicated schematically at 210.

Some embodiments of the invention may be described by considering the following basic model. Any end-point can launch into the network a request for some particular content. That request propagates through the network nodes even, if necessary, to all the other end-points. If the requested content is found at any node or end-point then a copy of it is returned to the requester. As the original request propagates, it leaves a trail at all network nodes. The content is routed back along the path using that trail. Thus, the content request is used instead of an IP address to build a routing table that directs the content to the requester.

In some embodiments, an overlay network policy may decide whether to keep copies of content at a node for load balancing or other purposes.

Some embodiments may include three types of message for use within the network. The first, Content Registration, advertises to the network that new content is available. The second, Request Registration, seeks particular content. The third, Content Delivery, moves the content toward those who have requested it. In some embodiments, content registration carries the content descriptor with it. Delivery carries both the content and its descriptor. Request registrations carry instruction on what to look for in a descriptor.

The following examples describe simple operation for a small network and also how, in a large network embodiment, the model can be enhanced by structure that minimizes the flooding of requests, avoids potential duplication of content delivery and permits aggregation in the tables at the routing nodes.

In some embodiments, all content has a descriptor. The descriptor can be as simple or as complex as the content requires. The content and the body of the descriptor can be in any format or language as long as some key part of the descriptor is in a form recognizable to the local network nodes so that the content can be propagated toward the nodes that can deal with it.

In some embodiments, every descriptor contains a unique identifier. Multiple copies of content may have additional keys in order to identify each copy uniquely.

In the following, an example according to one embodiment of the present invention is described. For this example we will assume that the standard for describing content is ONIX (see http://www.editeur.org). This standard is based on XML and uses codes to indicate what attribute of the content is being described. For example, the following codes may be used:

<b029>A Survival Guide to Copyright and the Permissions Process</b029>

<b037>Risher, Carol</b037>

<b044>Vice President, Copyright and New Technology, Association of American Publishers</b044>, where b029 is the code for a title; b037 is that for an author and b044 shows the author's affiliation.

The coding scheme is quite comprehensive and covers everything from keywords to rights of use. Codes can be added for a broader use in the content network.

In some embodiments, a request payload may be one or more instructions on what to look for in the content descriptor. For example, a request can be as simple as searching for matching text anywhere within the descriptor (e.g. SEARCH <*> CONTAINS gardening) or can be very precise such as looking for an author with a particular background (e.g., SEARCH <b029> CONTAINS copyright AND <b044> CONTAINS association of american publishers).

The invention supports all the standard search instructions (e.g., EXACT MATCH, STARTS WITH, CONTAINS, AND, NOT, OR, etc.) In addition, some embodiments enable the search to be extended to the content itself rather than just the descriptor.

In some embodiments, a request payload is also a piece of content and may be recognized by those nodes looking for that type of content. Some requests can be handled by every node whereas others will be carried as content to particular nodes that handle that type.

Figure 3A:
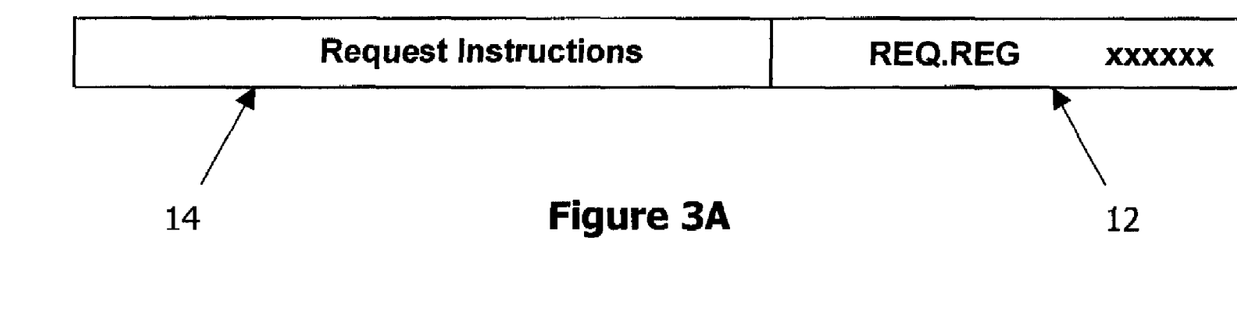
FIGS. 3A and 3B are schematic representations of requests for content and delivery of content according to one embodiment of the present invention.
Figure 3B:
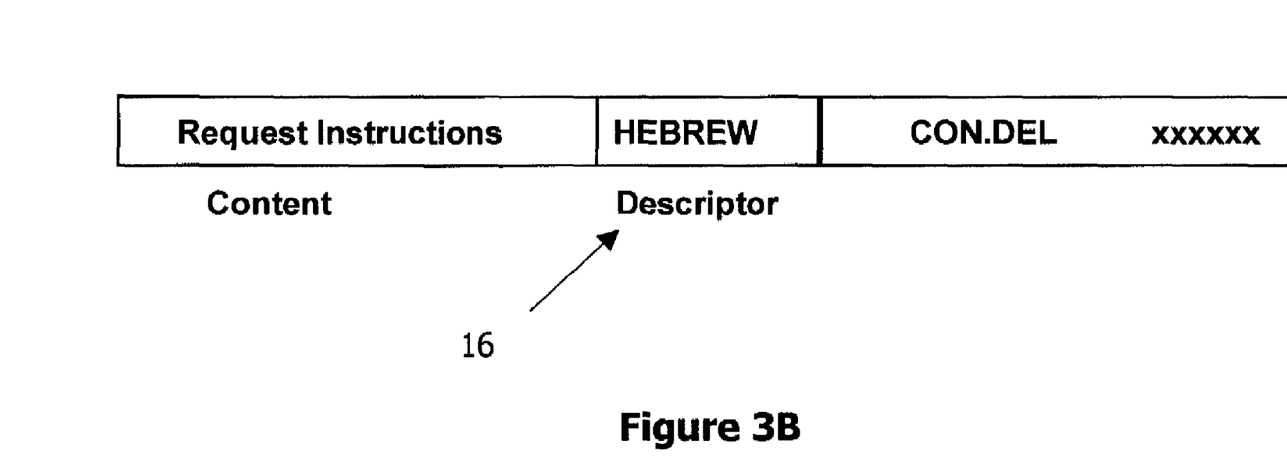

In the example shown in FIG. 3A the description code 12 REQUEST is recognized by a network node as being a request in the format that it can handle itself and it can use the request instructions 14 to operate on the descriptors of all the content that it is storing to see if there is a match. Another request shown, for example, in FIG. 3B, might be in Hebrew. Most network nodes would not be able to handle this so the request is sent as a content delivery message and is forwarded to specific nodes that had launched requests for any content containing the word HEBREW 16 and they would receive and process Hebrew requests.

The node that launches a request to see anything the word HEBREW is in effect, registering itself on the network as a service. The network is not, and does not have to be, aware of this. As will be appreciated by those skilled in the art, many new services can be built on the basic structure.

In some embodiments, each request may also indicate its persistence. For example, a request can be erased after it finds the first match or can be left in place for an extended period, for instance to continually gather updates on a topic. A request can be cancelled by a source by sending an erase request referring to the unique identifier. In some embodiments, all requests have some limited time-to-live and long term persistence may be implemented by generating new requests.

In one embodiment, the requests are flooded through the network. Each node may store a copy of the request mapped to the identity of the adjacent node that it was received from and may forward the request to all other adjacent nodes. Any incoming request may be compared to those currently stored and duplicates (those with the same identifier) are discarded.

When content enters the network it will not move from the entry node until someone requests it. When an incoming request matches with the descriptor, the content may be forwarded to the adjacent node from which the request was received. Each node along the path may compare the descriptor with all stored requests and will forward the content so that it travels back along a path to the source of the request.

In some embodiments, nodes may discard the content after forwarding it or might store the content for future use. Content switching nodes can also generate requests. A load balancing or congestion avoidance service can tell the node to request and hold certain content.

Figure 4:
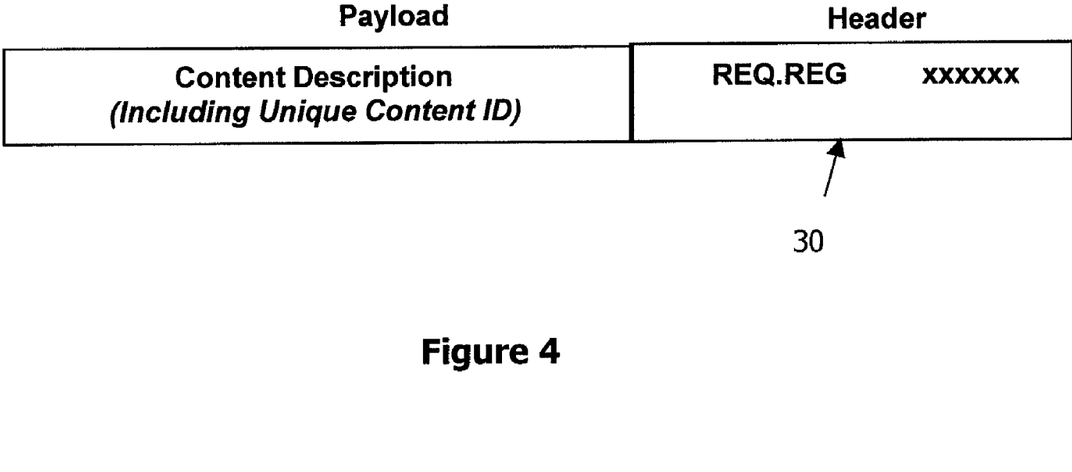
FIG. 4 is a schematic representation of a registration of content according to one embodiment of the present invention.

In embodiments that comprise a larger network it may not be viable to do many complex matches of request to descriptor at all nodes. In these embodiments, it may be more efficient to designate specific nodes for this service. Such a service node can request that all new content descriptors and all new requests are forwarded to itself. New content would be registered on the network by encapsulating the content descriptor within a registration header 30 as shown, for example, in FIG. 4. All content with this code would be forwarded to the service node.

In some embodiments, the service node may do the matching of requests to descriptors and will pass back the unique content identifier to the requester. The requester may then launch another request which is looking for the specific content identifier. Matching on just an identifier is a much simpler computing task for the network nodes.

By adding some structure to the network, these service nodes may be provided to serve subsets of the network. For example, a service node may exchange new content descriptors with all similar nodes but would only serve requests from its local network subset. A hierarchical approach to distributing content descriptors may be implemented to minimize the network traffic.

In some embodiments, in order to make the content network very scalable it is suggested to introduce even more structure. For example, consider if every node had an identifier and launched requests for any content that contained that identifier. This advertises its location to the network.

Figure 5:
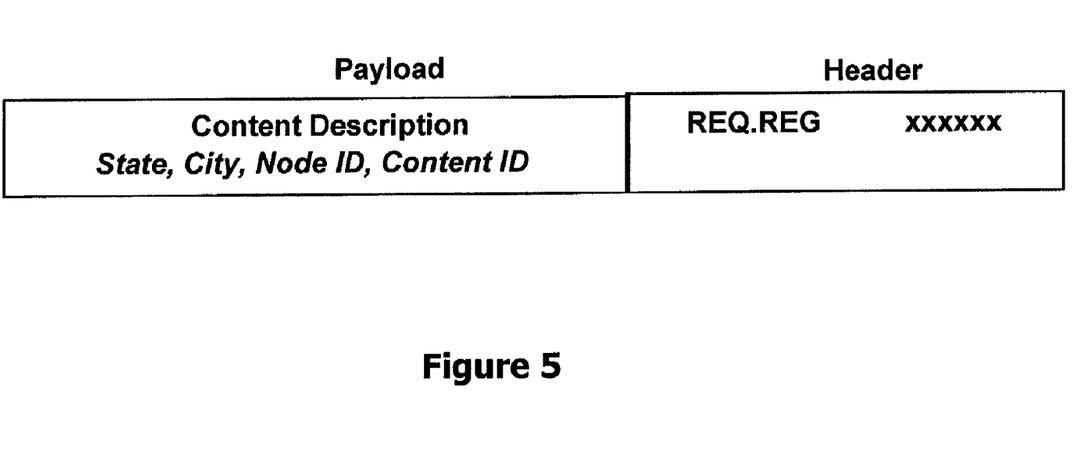
FIG. 5 is a schematic representation of a request for content indicating a location name according to one embodiment of the invention.

Further consider a service that returns, for any content identifier, the identifier of the node that contains the content. Then a request can be routed based on the content location. The location identifiers can be structured (such as country, province, city, etc.) so as to facilitate aggregation (that is, routing on a subset of the identifier similar to current IP routing) and thus reduce the computing and storage required. This is indicated schematically in FIG. 5.

In some embodiments, a service that returns the location of a piece of content should know the information for all content on the network and the service should be spread over many nodes to share the load. One way to do this is, for example, to create a binary search tree. In such and embodiment, all requests go to a root node which allocates the request to a branch node based on the content identifier that is being looked for. One branch node would handle all identifiers higher than some number and the other branch would handle the rest. Each node would similarly split the load until a leaf node is reached (that is, a node that can handle all requests received without having to off-load further). The nodes on any branch can be provisioned as needed and the information can be duplicated and can float.

Figure 6:
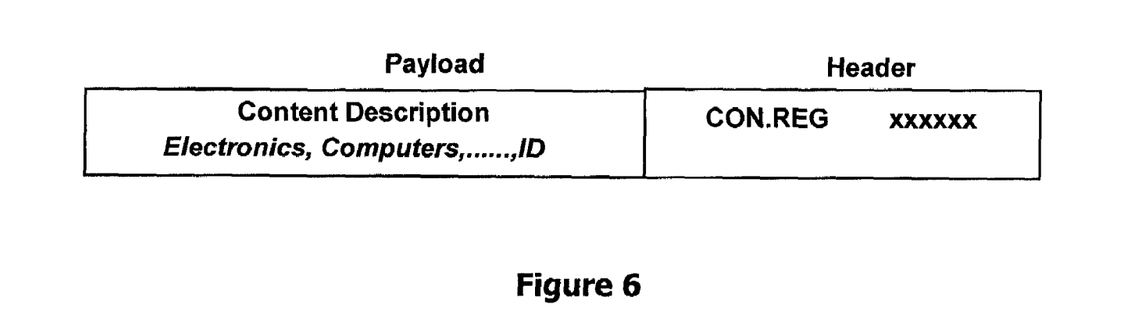
FIG. 6 is a schematic representation of a message using a content descriptor that conforms to a hierarchical structure for categorizing content according to one embodiment of the invention.
Figure 7:
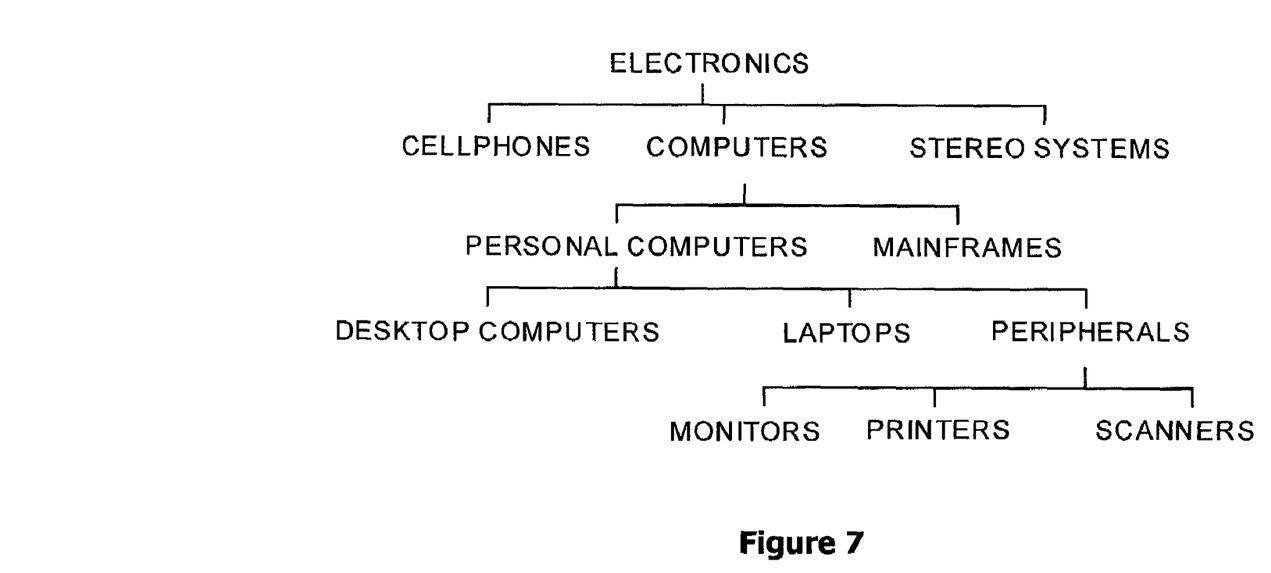
FIG. 7 is an illustration of a hierarchical structure for categorizing content according to one embodiment of the invention.

Another embodiment includes routing based on a structured content descriptor. For example, the message in FIG. 6 has a description that conforms to a well known hierarchical structure for categorizing content such as is shown, for example, in FIG. 7. In some embodiments, this descriptor could be supplied by the originator of the content or by a network service that inspects the content or its full descriptor when the content is initially registered.

In these embodiments, certain areas (which need not be geographically or topologically small) of the network may be given responsibility for particular types of content, for example a node might own anything under ELECTRONICS, COMPUTERS. The ownership of this sub category may be advertised to the rest of the network and requests for anything in the sub category may be routed toward that part of the network and eventually to the particular node. For additional scalability, at each level of the information structure hierarchy a particular category can point to a federation of nodes, rather than a single node, which jointly hold the relevant content. If a search fails on one of the nodes the request can be directed to another member of the federation to satisfy the request.

In some embodiments, the sequence of operations is as follows. The originator of the content categorizes it according to the known structure. New content is registered on the network by launching a content registration message containing the categorization. This message may be propagated to the part of the network that has advertised ownership of the sub category that it falls into. The node that is to store the content notes the registration message and launches a request message back along the trail left by the registration message. Then the content is forwarded to the requesting node along the trail left by the request.

In some embodiments, the routing tables that represent the trail through the network can take advantage of aggregation. For example, since requests for MONITORS, PRINTERS OR SCANNERS all have to be directed to the node that owns ELECTRONICS, COMPUTERS, only the higher order parts of the descriptor need to be stored.

When structured approaches such as location or content categories are used, some of the routing techniques used in IP networks can be re-used in the content network. In particular the concept of Autonomous Systems (AS) linked with a Border Gateway Protocol (BGP) can be used to optimize the network operation. For example, see FIG. 8.

One example of content registration may be described with reference to FIG. 8. As shown, a content registration REG1 with contents relating to the sport of fishing enters the system at node B4. Node B4 checks high-order labels in the content descriptor and determines that the contents are about fishing. In this example, node B2 leads to an AS interested in carrying fishing contents. Backbone AS forwards REG1 to B2, possibly via interior nodes such as R4. Content tables for B2 at interior nodes can be established by flooding AS with request registrations from B2 using distance vector (DV) protocols.

Figure 8:
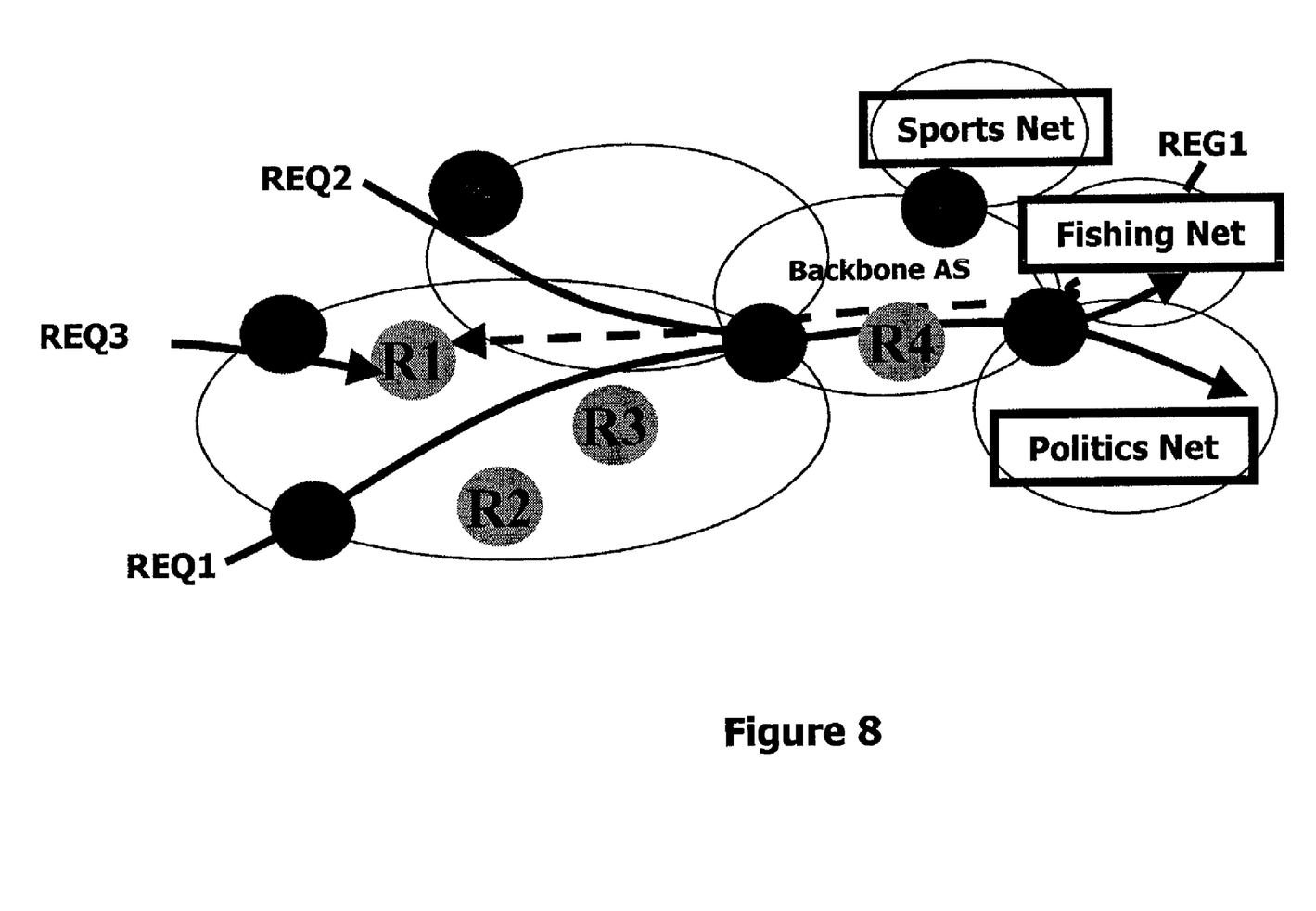
FIG. 8 is a schematic illustration of the structure of a content network according to one embodiment of the invention.

Another example illustrated in FIG. 8 shows a Request Registration according to one embodiment of the invention. As shown a first request registration REQ1 enters at node B3. Node B3 checks the content descriptor to determine if REQ1 is for the current AS. If the request is current, flood the current AS, (i.e., R1, R2, etc.,) using DV-like protocols. Node B3 also checks the content descriptor to determine if the request REQ1 is for any neighboring AS. If it is, node B3 may forward the request REQ1 to the corresponding border node (e.g. B2).

Another example illustrated in FIG. 8 shows Content Delivery according to one embodiment of the invention. As shown, a request REQ3 for fishing content enters node R1 where content has already been registered (REG1). Node R1 recognizes a match, and forwards request REQ3 to a content source, (e.g., a node in Fishing Net). The node in Fishing Net sends a content delivery message with the requested content to the request REQ3's originator by following request REQ3's trail.

In another example, a content registration REG1 with fishing content enters node R1 where request REQ3 has already registered. Node R1 recognizes a match, and forwards registration REG1 to request REQ3's originator by following request REQ3's trail. Request REQ3's originator issues another request registration like request REQ3. Node R1 recognizes a match, and forwards request REQ3 to a content source, (e.g., a node in Fishing Net). The node in Fishing Net sends a content delivery message with the requested content to the request REQ3's originator by following request REQ3's trail.

One example of how the system hierarchy operates may be illustrated with reference to FIG. 8. For example, a request REQ2 enters at node B2. Node B2 checks high-order labels in the content descriptor to determine to which neighboring AS request REQ2 should be forwarded. Suppose that request REQ2 requests for contents in politics. Then backbone AS will forward request REQ2 to node B4, rather than node B6.

In the situation where aggregation occurs, request REQ1 and request REQ2 may share the same content entry in node B2. Node B2 may use only high-order labels in the content descriptor.

In some embodiments, network nodes use the same mechanisms for Content and Request Registrations, as summarized below. Upon receiving any of these messages, a border node: Checks a hierarchical view of the content descriptor (e.g., high-order labels, against content table at the node); forwards the message to selected neighboring AS, if needed; and floods the current AS using DV, if the content is of interest to the AS. This builds content tables at nodes in the AS. A trail for the message is now cached at these nodes.

This structured form of content descriptor can be service specific and each service can have its own structure while taking advantage of the aggregation capability of the network. For example, the service name can be part of the structure.

In some embodiments, multiple copies of content can be kept in the network. The number and location of the copies may be based, for example, on requirements for load balancing, security etc. In addition, the copies can float in the network moving from one node to another as required.

One advantage of the present invention is that the type of hostile attack seen in the IP network is not so easy in the content network. In an IP network the capability to make end-to-end connections permits a hostile user to attack the content on another machine or to cause the other machine to perform specific tasks on behalf of the hostile user. Denial of service can be done by making myriad requests for the same content from many machines. However, such operations are not possible on a content network. There is no concept of end-to-end connections and manipulating another user's machine is not possible. Any request storm has to come from one source which can easily be identified. Furthermore, there are multiple sources for content and more copies can be spawned to counter heavy demand.

A request can carry with it information on the resource and service requirements of the content it is asking for. Thus each network node can assess its capability to handle that content. Existing quality of service mechanisms developed for IP networks can be duplicated in the content network.

Early forms of content networking exist in the form of peer-to-peer services like Gnutella but the content network of the present invention provides for a much more scalable and versatile service platform. Most powerful is the ability for the request to include filtering and operational instructions to refine the match and content delivery.

Since the content is visible to the network, it is possible to construct content sensitive traffic treatment and billing systems. Persistence of requests is also an optional parameter so services can be built that continuously deliver current content to an end-point.

In addition, current packet based services can be duplicated. For example, the request can take the form of an IP address and the content can be a traditional IP packet (note that for simple and small content, the descriptor is similarly quite small) Furthermore, the request can be a name such that a mail service can be built. The user would launch a request for all content containing his mail identity. Likewise, communities of interest can build an any-to-any network quickly and simply by agreeing on a key phrase or identifier and registering content.

Because the content network does not require an IP network in order to operate, it can use transport protocols more suited to bulk transfer in the core of the network. If, for instance, data centers are connected by dedicated optical pipes then the content nodes could use a protocol that is able to transfer content in large blocks rather than traditional packets. This fits in well with new techniques being developed for distributed network storage.

Figure 9:
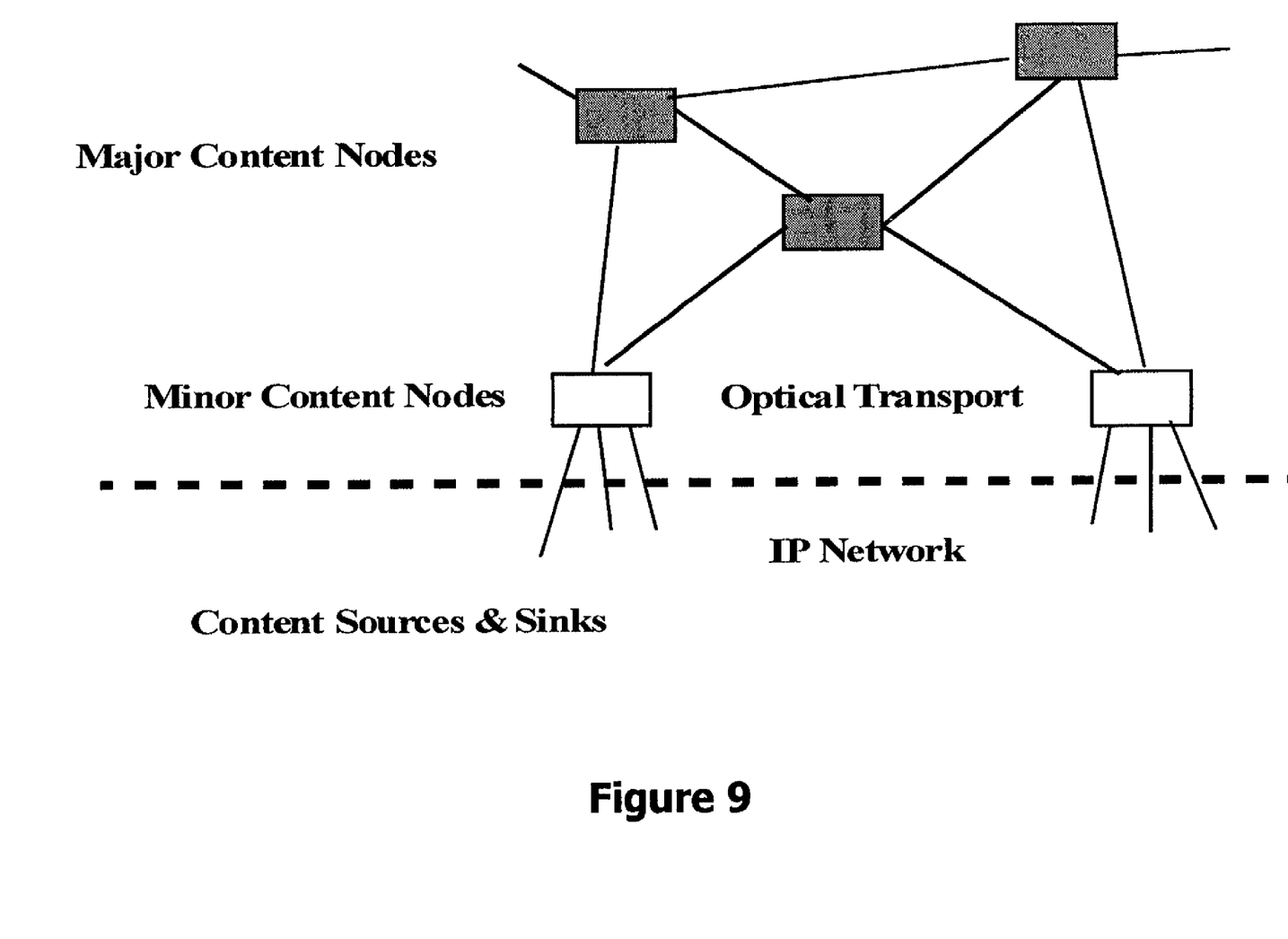
FIG. 9 is a schematic illustration of a transport network between content nodes according to one embodiment of the invention.

One application of the content network is between data centers and peripheral caching points as illustrated, for example, in FIG. 9. The content nodes may be connected using optical transport and the IP network may be used for the connection to the users.

Internet operators are building large numbers of Internet services distribution centers, which could be servers hosting sites, application service providers, or data centers. Large centers typically assume dual roles of being exchange points for ISPs and hosting sites for content providers. It can thus be expected that these centers will be a major player in content distribution for the next several years.

It is natural that content networks be used to link these centers together. Via content networks, centers will filter, store and forward contents for other centers. These centers equipped with content networks may form a large, globally distributed content store, with caching and load-balancing support. For most of the current contents, they will be accessible directly from one of the local centers.

It is well-known that content caching at nodes of the network edge can help provide high-quality, on-demand multimedia content delivery services to end users, while reducing bandwidth requirements on the backbone. However, managing such caching systems on a very large scale can be challenging. A content such as a movie may have many versions, and there can be millions of such contents to be cached. In the meantime, there could be tens of thousands ISPs, locally and internationally, which need to receive these content updates continuously, and some in real time.

A content network according to the present invention may cope with this complexity much better than conventional IP networks. For example, consider a core content network to which many ISPs have access. ISPs would submit their content requests to the content network, describing the contents that they would want to cache on their sites. Perhaps by being willing to pay premium prices, ISPs can submit content requests with relatively long persistence periods. When new contents or content updates become available, content providers would inject them into the content network using content messages. Then the content network would automatically deliver these messages to the relevant ISPs. When receiving such messages, ISPs will cache the contents in these messages.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

What is claimed is:

1. A method for delivering content over a network having at least one requesting endpoint and at least one node, wherein the content further comprises a descriptor that enables the at least one node to identify an attribute of the content and wherein the at least one node stores content, the method comprising:

launching a request for content from the at least one requesting end point, the step of launching a request comprising:

launching the request with a request payload containing one or more instructions on what to locate in the descriptor, wherein the descriptor comprises an ONIX code descriptor and the at least one node further comprises a receiver for receiving the request and identifying an adjacent node from which the request is received;

comparing the request payload to the ONIX code descriptor of the content stored at the at least one node; and when the request payload matches the ONIX code descriptor, forwarding the content with the matching ONIX code descriptor to the adjacent node;

propagating the request over the network to the at least one node;

leaving a trail of the request at the at least one node; and, when content matching the request is located, returning a copy of the content to the at least one requesting endpoint over the trail of the request.

2. The method of claim 1, wherein the network comprises at least one other endpoint and the method further comprises:

propagating the request over the network to the at least one other endpoint; and leaving a trail of the request at the at least one other endpoint.

3. The method of claim 1, further comprising:

launching the request with a persistence indicator that indicates a duration for which the request is to be preserved at the at least one node.

4. The method of claim 3, wherein the step of leaving a trail of the request further comprises:

storing the request at the at least one node for a duration given by the persistence indicator.

5. A system for delivering content over a network having at least one requesting endpoint and at least one node, wherein the content further comprises a descriptor that enables the at least one node to identify an attribute of the content and wherein the at least one node stores content, the system comprising:

a request launcher for launching a request for content from the at least one requesting end point, the request launcher comprising:

a launch module for launching the request with a request payload containing one or more instructions on what to locate in the descriptor, wherein the descriptor comprises an ONIX code descriptor and the at least one node further comprises a receiver for receiving the request and identifying an adjacent node from which the request is received;

a comparator for comparing the request payload to the ONIX code descriptor of the content stored at the at least one node; and a forwarder for forwarding, when the request payload matches the ONIX code descriptor, the content with the matching ONIX code descriptor to the adjacent node;

a propagator for propagating the request over the network to the at least one node;

a request trailer for leaving a trail of the request at the at least one node;

and, when content matching the request is located, a content forwarder for returning a copy of the content to the at least one requesting endpoint over the trail of the request.

6. The system of claim 5, further comprising:
a persistence indicator that indicates a duration for which the request is to be preserved at the at least one node.

7. The system of claim 6, wherein the request trailer further comprises:
a storage module to enable storing the request at the at least one node for a duration given by the persistence indicator.

8. An article of manufacture for delivering content over a network having at least one requesting endpoint and at least one node, wherein the content further comprises a descriptor that enables the at least one node to identify an attribute of the content and wherein the at least one node stores content, the article of manufacture comprising:
at least one processor readable carrier; and
instructions carried on the at least one carrier;
wherein the instructions are configured to be readable from the at least one carrier by at least one processor and thereby cause the at least one processor to operate so as to:
launch a request for content from the at least one requesting end point the launch further comprising:
launching the request with a request payload containing one or more instructions on what to locate in the descriptor, wherein the descriptor comprises an ONIX code descriptor and the at least one node further comprises a receiver for receiving the request and identifying an adjacent node from which the request is received;
compare the request payload to the ONIX code descriptor of the content stored at the at least one node; and when the request payload matches the ONIX code descriptor,
forward the content with the matching ONIX code descriptor to the adjacent node;
propagate the request over the network to the at least one node;
leave a trail of the request at the at least one node; and, when content matching the request is located,
return a copy of the content to the at least one requesting endpoint over the trail of the request.

* * * * *